United States Patent [19]

Czeiler et al.

[11] Patent Number: 4,610,217
[45] Date of Patent: Sep. 9, 1986

[54] APPARATUS FOR ELECTROSTATIC SPRAYING OF THE INSIDES OF LAMP ENVELOPES

[75] Inventors: András Czeiler; Miklós Kéri; Béla Balogh; Ernö Fejes; István Kállai; Sándor Lukács, all of Budapest, Hungary

[73] Assignee: Tungsram Reszvenytarsasag, Budapest, Hungary

[21] Appl. No.: 679,609

[22] Filed: Dec. 7, 1984

Related U.S. Application Data

[63] Continuation of Ser. No. 491,570, May 4, 1983, abandoned.

[30] Foreign Application Priority Data

Sep. 22, 1982 [HU] Hungary ............................ 3035/82

[51] Int. Cl.[4] ...................... B05B 5/02; B05B 13/02; B05B 13/06
[52] U.S. Cl. ....................................... 118/47; 118/302; 118/312; 118/319; 118/622; 118/630
[58] Field of Search ............... 118/622, 630, 312, 319, 118/47, 302

[56] References Cited

U.S. PATENT DOCUMENTS

| | | | |
|---|---|---|---|
| 2,811,131 | 10/1957 | Lopenski et al. | 118/622 X |
| 3,961,600 | 6/1976 | Homer et al. | 118/312 X |
| 4,499,118 | 2/1985 | Dietz et al. | 118/622 X |

*Primary Examiner*—Evan K. Lawrence
*Attorney, Agent, or Firm*—Karl F. Ross; Herbert Dubno

[57] ABSTRACT

An apparatus for electrostatic spray coating of the insides of light transmissive lamp envelopes, comprising a stand, a turntable mounted on the stand for receiving pairs of the envelopes, gas burners for preheating the envelopes and burning in the sprayed coating layer and serving as an electrode to ground the envelopes, a dust generator for preparing and homogenizing, with a rotary chopper, the particles of the dust to be sprayed on the envelopes as the coating layer, spray guns with dust conduits connected to an exhaust system for collecting the particles of dust not bound in the layer and made free during spraying. The apparatus further comprises an electrostatic voltage source connected to the nozzles of the spray guns for negatively charging the dust particles so that the particles are electrostatically attracted to the envelopes, and elements to allow cleaning of the apparatus.

3 Claims, 5 Drawing Figures

APPARATUS FOR ELECTROSTATIC SPRAYING OF THE INSIDES OF LAMP ENVELOPES

This is a continuation of copending application Ser. No. 491,570 filed on May 4, 1983, abandoned.

FIELD OF THE INVENTION

The invention relates to an apparatus for the electrostatic spraying of the inside of various types of lamp envelopes and which comprises a stand, a rotatable table movable on the stand, driving means, mechanical control means, means for supporting the lamp envelopes, gas burners for preheating the lamp envelopes and burning in the layer sprayed thereon and serving as an electrode, a dust generator for preparing and homogenizing the dust to be burned into the lamp envelopes, spray guns with dust conduits connected to them, an exhaust system for collecting the particles of the dust not used for the layer and made free during spraying, and high voltage supply means and other well-known elements used in the production of lamp envelopes. The apparatus can be used for the automatic electrostatic coating of the transparent or translucent elements of light sources with high efficiency.

BACKGROUND OF THE INVENTION

The inner surface of the light-source or lamp envelope should often be covered by a layer prepared from materials having a definite graininess. The layer prepared should be able to provide diffuse light, to modify the spectrum of the light emitted by the filament, or to transform the light of an ultraviolet spectrum emitted by a gas discharge lamp into light of the visible spectrum.

The most modern method of producing such layers is by electrostatic spraying. Apparatuses for electrostatic spraying are described for example in the U.S. Pat. Nos. 2,806,844; 2,881,131; 2,921,827; 3,017,852; 4,081,709; and 4,099,080.

Electrostatic spraying is in essence a method, whereby the inner surface of the light-transmissive envelope is covered by a dust formed from an inorganic material. The dust grains are transformed into a smoke form and the smoke particles are given an electrostatic charge in a desired way and blown into the glass envelope made electrically conductive by heating. The glass envelope is connected with one of the electrodes by the flame used for heating while the other electrode constitutes part of the means used for electrostatically charging the dust particles. When the smoke particles meet the surface of the glass vessel an electric circuit is closed between the electrodes.

The U.S. patents cited above relate to various units for the practical realization of the electrostatic spraying method in lamp producing plants; in this way the use of hydrofluoric acid for making the envelopes translucent or the use of fluid suspensions for this purpose can be avoided at the inner surface.

U.S. Pat. No. 3,961,600 describes an apparatus in which the dust is blown into the envelope in four positions, one after another. This apparatus can provide a layer of a desired thickness and high uniformity; however, productivity of production is limited by the number of positions.

U.S. Pat. No. 2,017,852 describes an apparatus for electrostatic spraying in which there are two times six stationary positions for spraying with the envelopes being coated alternately. This renders high productivity possible, however the positions are stationary and therefore there is a difference between the thickness values of different layers which is impossible to correct later.

OBJECTS OF THE INVENTION

An object of this invention is to provide an apparatus of high efficiency for electrostatic spraying lamp envelopes which avoids the disadvantages mentioned above in connection with the known apparatuses.

In order to increase the electric conductivity of the glass material of the lamp envelopes it is well known that the envelopes should be heated by means of gas flames trained directly upon them. As proposed in the U.S. Pat. Nos. 2,806,444 and 2,995,463 gas burners shaped according to the outer line of the envelopes to be sprayed can be used. The disadvantage of this is in that the preheating is carried out in nonuniform strips and this results in a non-uniform thickness of the layer produced.

According to U.S. Pat. No. 2,921,827 heat radiators can be used. This also fails to ensure the uniform, homogeneous preheating of the vessels.

Another object of the present invention, therefore, is to provide a preheating system for an apparatus for the electrostatic spraying of lamp envelopes which avoids the disadvantages mentioned above and ensures uniform preheating.

A basic condition of electrostatic spraying is the production of a homogeneous dust smoke. It should be understood that every apparatus for electrostatic spraying is equipped with a dust generator which should generate homogeneous dust smoke as basis for electrostatic spraying. One such apparatus is described e.g. in the U.S. Pat. No. 2,811,131. As in most such systems the one described also comprises a dust generator having two chambers. The first of the chambers comprises mixing means for agitating the dust and the dust is carbureted with air by means of a Venturi tube. In the second chamber, the so-called expansion chamber, the coarse grains are separated from the smoke. This arrangement is characterized by complex construction and yet inhomogenity of the smoke dust. Another disadvantage is that it is impossible to avoid agglomeration of the dust particles due to the electrostatic charging during generating the dust.

A further object of the present invention, therefore, is to avoid the mentioned disadvantages of the prior-art two-chamber dust generators of electrostatic spray apparatus for spraying vessels by eliminating the possibility of agglomerating.

In certain known devices, as described e.g. in the U.S. Pat. No. 3,335,024, the spray gun is directly connected by a dust conduit with the expansion chamber of the dust generator, generally via a valve. The disadvantage of this is the possibility of dust agglomeration in the relatively long and movable dust conduit. The dust can deposit on the wall of the conduit and this leads to production of a sprayed layer which irregularly covers the wall of the lamp envelope.

It is therefore another object of the present invention to avoid this disadvantage in connection with the known electrostatic apparatuses for spraying lamp envelopes.

For removing dust which accumulates in the spray gun and for cleaning the gun the known systems comprise sophisticated techniques based on valves. Systems of this type can be found in the U.S. Pat. Nos. 2,884,895 and 3,335,024. These complex systems have a lot of disadvantages; for example removing the agglomerates cannot be carried out without difficulties, the valve surfaces can collect the dust, the efficiency of cleaning is low etc.

It is also an object of the present invention to provide a system which eliminates the disadvantage mentioned above in connection with the known electrostatic apparatus for spraying lamp envelopes, and whereby the cleaning can be carried out quickly, with high efficiency.

The recirculation of the dust not used for spraying the vessel during production and collected by the exhaust and cleaning system is ensured by the known systems in an indirect way. For example, the U.S. Pat. Nos. 3,335,024 and 3,961,600 describe a system wherein the collected dust is transported to a storage drum, wherefrom it is recirculated to the dust generator. This intermediate storage unit complicates the construction of the unit in a nondesirable and disadvantageous manner and therefore it is a further object of the invention, to find a solution according to which the intermediate storage unit in the electrostatic apparatus spraying vessels is not required.

In the foregoing disadvantages of the known apparatuses for electrostatic spraying vessels have been discussed. Because the problems described can impede the effective electrostatic spraying, it is also the object of the invention to provide an apparatus which is free of the above mentioned disadvantages, and enables the electrostatic spraying of lamp envelopes high efficiency, effective recirculation of dust and homogeneous layer deposition with as uniform a thickness as is possible.

In order to achieve these objects, an apparatus has been developed for electrostatic spraying of the insides of lamp envelpes which comprises a stand, driving means and mechanical control means for turntable on this stand, means for supporting the glass envelopes to be sprayed, gas burners for preheating the glass envelopes and burning in the sprayed layer and serving as an electrode, a dust generator for preparing dust to be burned into the vessels, spray guns with dust conduits connected to them, an exhaust system for collecting the particles of dust not used for the layer and liberated during spraying, high voltage supply means and other elements of the lamp production in an automatic production line. According to the invention the spray guns are equipped with spraying heads of radial duplex arrangement, and the apparatus further comprises heat radiating means for heating the envelopes and, shaped to correspond to the shape of the vessels,
means for directing the dust stream, and for chopping and homogenizing the dust stream produced by a nozzle in the dust generator,
means for guiding away the charge produced in the dust during homogenizing and chopping, connected with the means for directing, chopping and homogenizing,
a radial cyclone connecting the electrostatic spray gun to a dust conduit,
means for cleaning the radial cyclone and the spray gun arranged in the spray gun, and
means for recirculating the dust collected by the exhaust system.

Advantageously the heat radiating means are constructed in form of a radiator; the means for directing, for chopping and homogenizing the dust stream comprise a rotor, and the directing sleeve for the stream; and means for recirculating the dust comprises an exhaust insert.

The apparatus for electrostatic spraying of the invention increases the production of lamp envelopes and can be used more easily than known apparatus for this purpose.

BRIEF DESCRIPTION OF THE DRAWING

Further objects, feature and advantages of the invention will become better understood from the following detailed description of some embodiments shown purely by way of example when considered in conjunction with the accompanying drawing, wherein.

DETAILED DESCRIPTION

Figure 1:
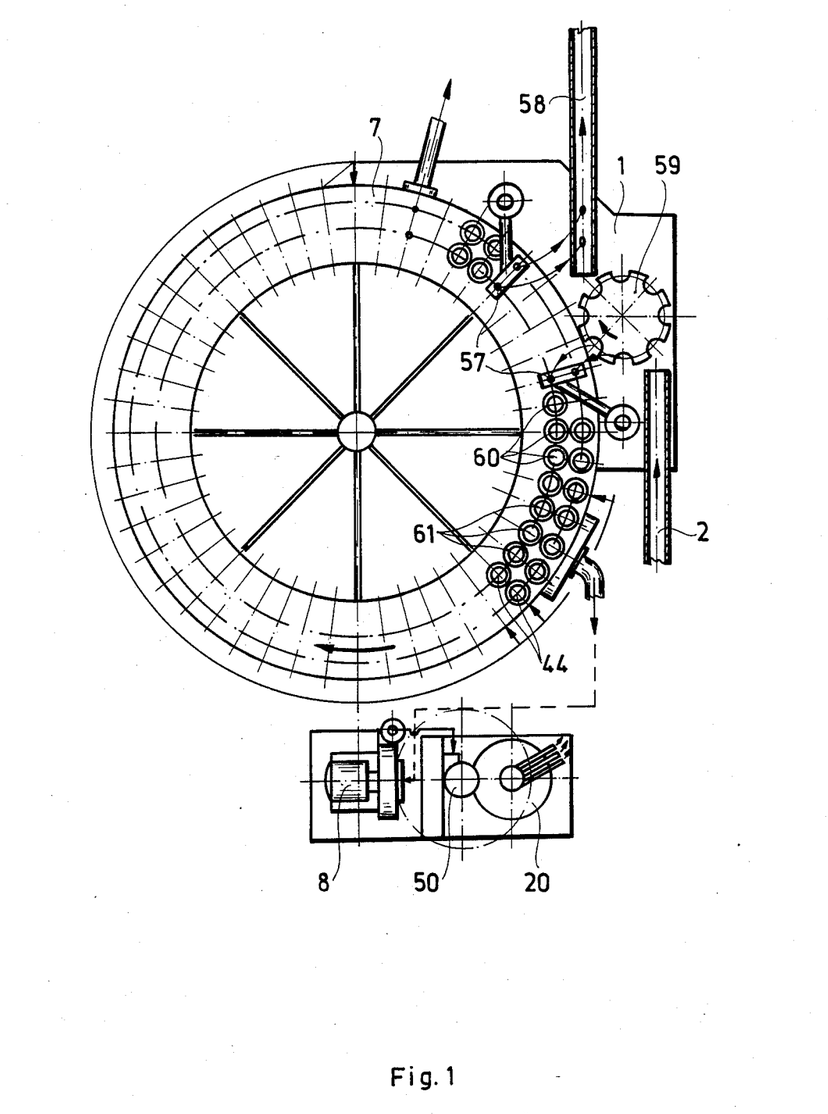
FIG. 1 is a top view of a preferred embodiment of the apparatus for electrostatic spraying of the invention.
Figure 2:
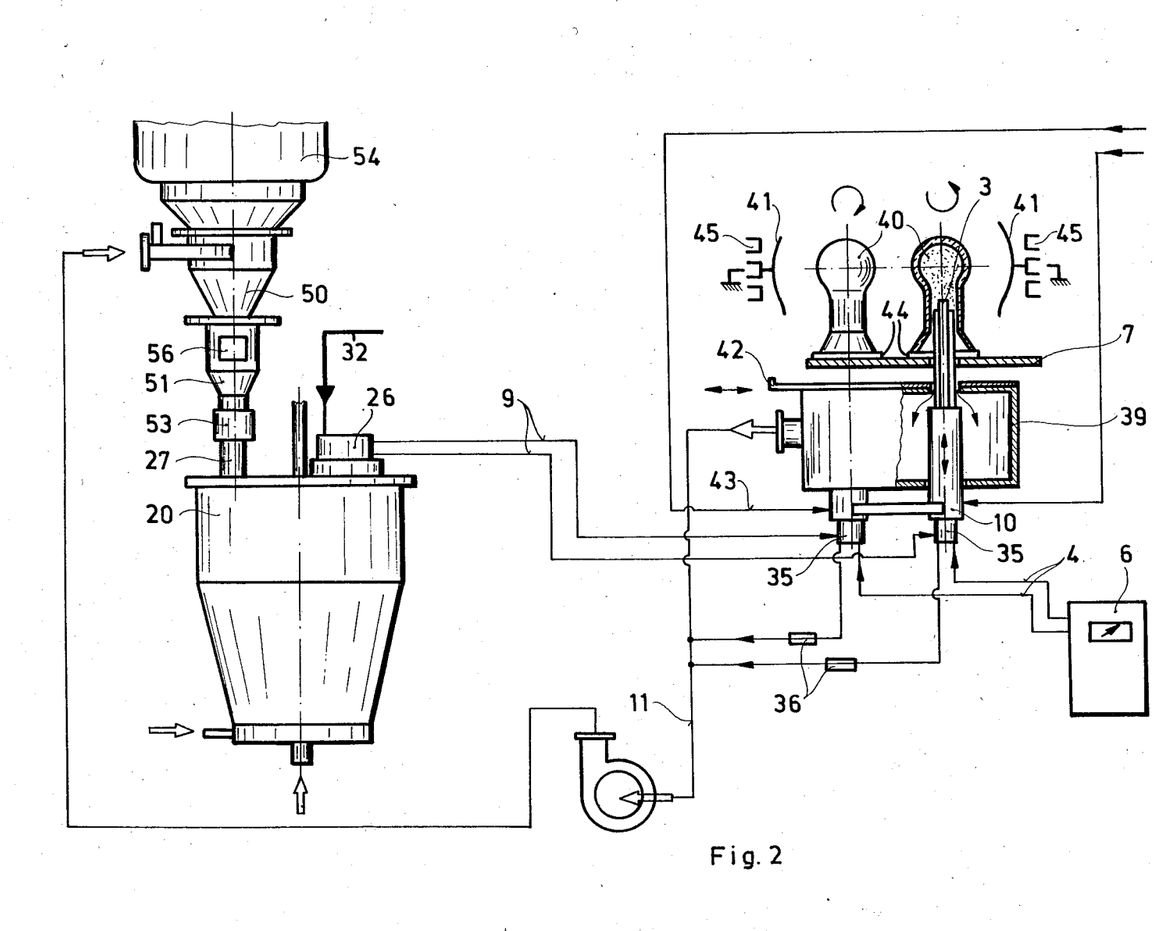
FIG. 2 is a partially schematic diagram illustrating the operation of the apparatus.

FIG. 1 shows a top view of an electrostatic unit for spraying lamp envelopes 40 (FIG. 2). The apparatus has a stand 1 supporting a turntable 7. The apparatus further comprises spraying heads 44 in a duplex arrangement which is a part of the inventive system, and which is a new and unusual solution. The lamp envelopes are conveyed to a star wheel 59 by means of a feeding belt 2 (FIG. 1), and are transferred in pairs to the turntable 7 and in pairs meet the spraying heads 44 of duplex arrangement. By this solution an increase of effectiveness of the production to two times can be achieved at the same number of steps in comparison with known apparatus. This solution is a very important part of the invention since it leads to twice the effectiveness of production as in the known apparatus, however the number of technological steps remains unchanged.

As can also be seen from FIG. 1 the apparatus according to the invention comprises a dust generator 20, a cyclone 50, an exhaust system 8, and a loading and unloading mechanism 57 for loading and emptying the duplex heads 44.

The lamp envelopes sprayed are conveyed out from of the apparatus by means of an offtake belt 58.

The way of operating of the apparatus as invented will be described on the basis of FIG. 2 showing the apparatus in a working position.

The lamp envelopes 40 arranged in a radial display on the spray heads 44 of duplex arrangement should be preheated before blowing the dust into them. In this way the electrical conductivity of the glass material of the vessel can be increased. In the known devices gas burners are used directly for preheating. As mentioned above this solution leads to a nonuniform, strip shaped preheating of the vessels and thereby producing a layer with nonuniform thickness in strips. According to the invention the apparatus is equipped with heat radiators 41 shaped to follow the form of the envelopes 40 to be sprayed. The heat radiators 41 (FIG. 2) consist advantageously of heat resistant steel and if necessary, covered by a black layer for effective heat radiation and are heated by gas burners 45 to which they are connected (FIG. 2) on the side opposite to the glass vessels 40. Instead of gas burners 45 it is possible also to use electrically powered heat radiating or heating units as desired.

The dust to be carried into the preheated glass envelope is prepared in the dust generator 20. This generator is very important in operating the apparatus according to the invention and will be described in detail in connection with FIG. 3.

The dust will be transported by a dust conduit 9 to a radial cyclone 35. The dust conduit 9 is advantageously composed of an antistatic material. The radial cyclone 35 is also an important part of the apparatus according to the invention and will be described in detail in connection with FIG. 4.

Figure 4:
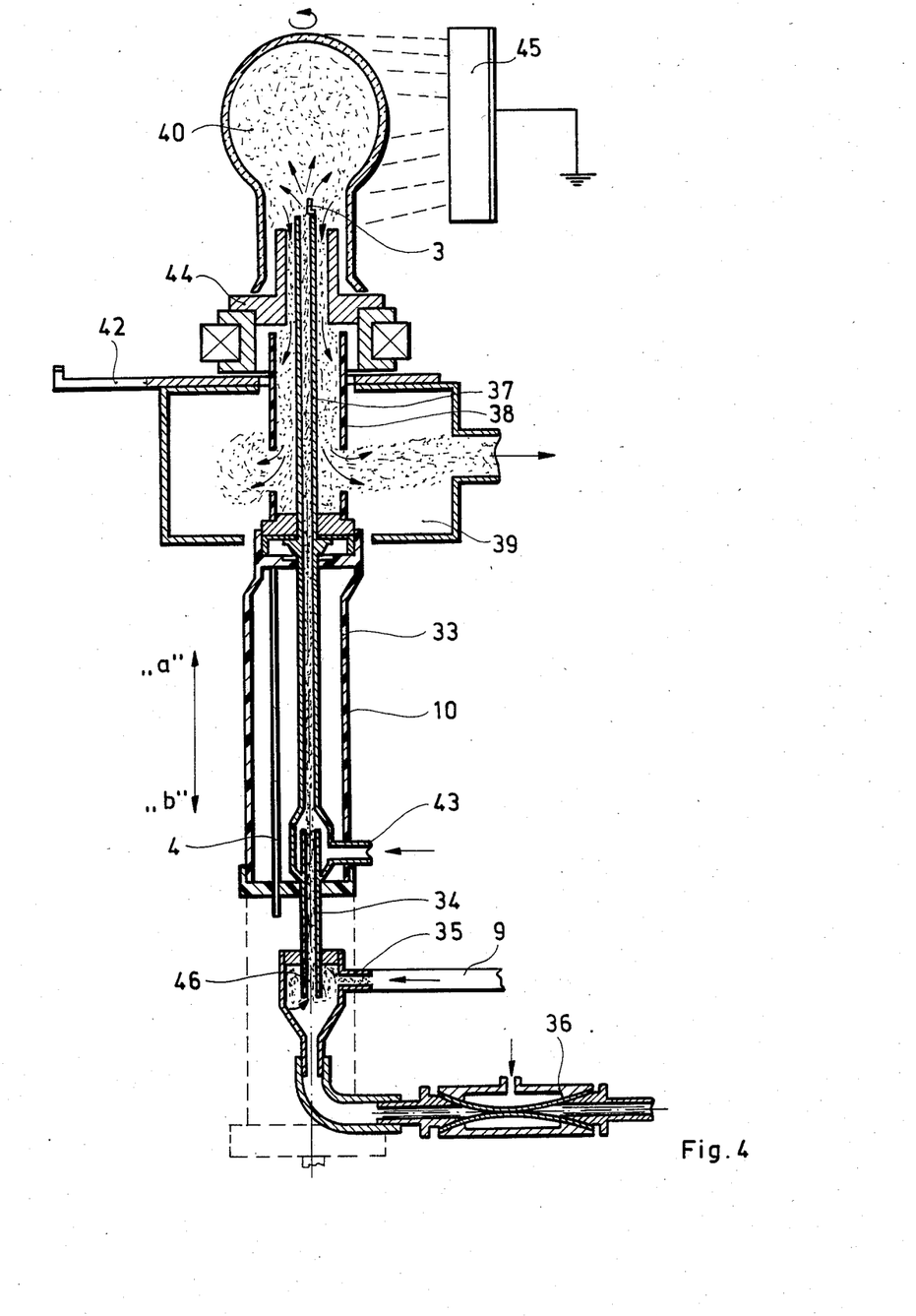
FIG. 4 is a cross-section of a spray gun used in the apparatus according to the invention.

A smoke dust of small particles should be made free of agglomerated parts during transport and is transported by the spray gun 10 from the radial cyclone 35 into the lamp vessel 40. During transporting, the dust flows adjacent to an ionizing electrode 3. The ionizing electrode 3 is connected with a power pole of a supply unit 6 via a high-voltage electric conductor 4, as shown in FIG. 2 the supply unit 6 should be capable of generating a high-voltage direct current. It is advantageous to connect the ionizing electrode 3 with the negative pole of the supply unit 6. The other pole which is grounded is connected from the supply unit 6 to the gas burners 45 (as is represented in FIGS. 2 and 4). The gas burners 45 and radiators 41 connected thereto are thus electrodes. On spraying the lamp envelopes the gas flame is allowed to contact the lamp vessels 40 and in this case the heat radiators 41 are not necessary and can be omitted (FIG. 4). The dust smoke flows beside the ionizing electrode 3 and is charged electrically. Under influence of the electric field generated by the ionizing electrode 3 and the grounded gas burner 45 the dust particles are deposited on the inner wall of the lamp envelope 40 and there lose their charge. As the electric circuit is closed between the glass material of the vessel and the gas flame.

By the end of the cycle of depositing the dust the spray gun 10 moves downwards and the envelopes may move on the turntable to other stations.

Figure 3:
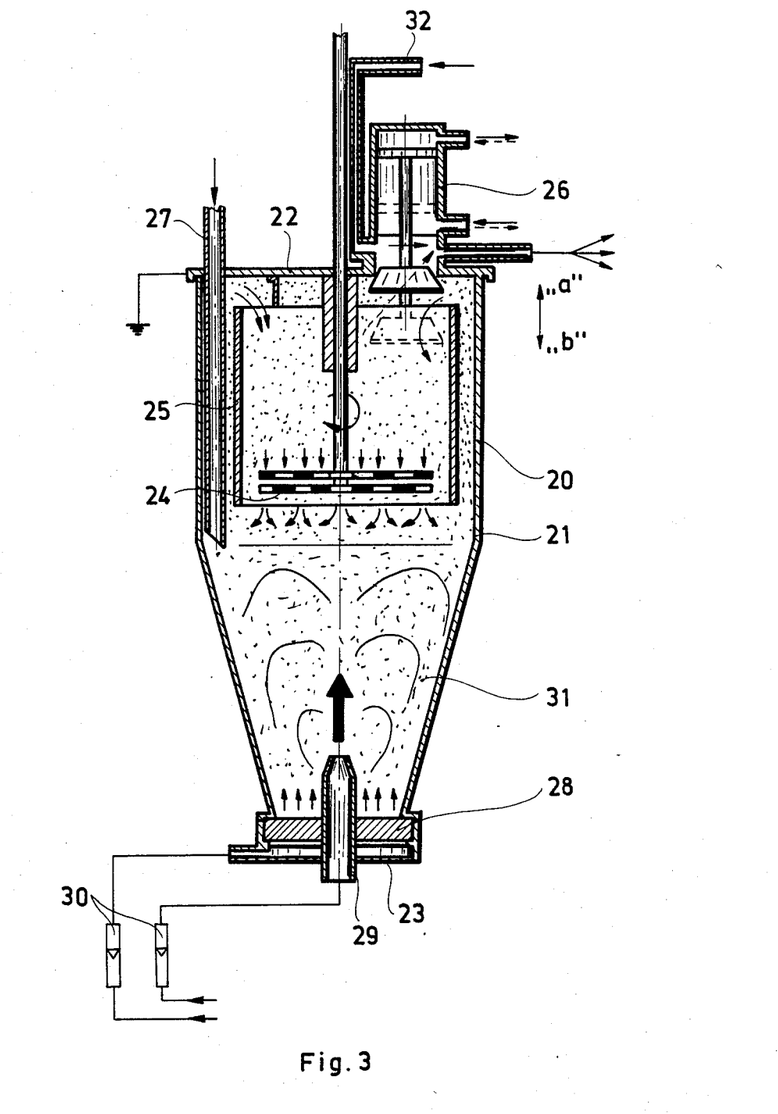
FIG. 3 is a cross-section of the dust generator of the apparatus proposed according to the invention.

The dust generator 20 for which a new inventive solution has been proposed is shown in cross-section in FIG. 3. This unit ensures generating of the dust, breaking up any agglomerated parts thereof and equalizing its concentration in the complete apparatus. The dust generator 20 is equipped with an essentially cylindrical-frustoconical container 21 having a cover plate 22 and a bottom plate 23. The cover plate 22 serves as a support for the rotor 24 and the sleeve 25 for directing flow, wherein the rotor 24 chops and mixes the particles of the dust smoke. The cover plate 22 is equipped with an air valve 26 for leading the dust to the spray guns 10. The dust recovered during electrostatic spraying is led into the dust generator 20 via a tube 27. The tube 27 is connected with a unit for recovery of the dust shown in FIG. 5.

The bottom plate 23 is equipped with a porous metal plate 28 arranged thereon, in the middle thereof is an air nozzle. The quantity of the air transported by the porous metal plate 28 and the air nozzle can be measured by means of rotometer 30.

The spray guns are constructed according to FIG. 4. A plastic body 33 comprises a dust conduit 34 and a blowing inlet 43, the bottom end of the conduit 34 is connected with the radial cyclone 35 made of hard glass or quartz. The coarse grain dust fraction separated in the radial cyclone 35 is carried away through a rubber lock 36 operated by air. The upper part of the plastic body 33 is connected with a metal tube covered by plastic material and thereby with the ionizing electrode 3, which electrode is arranged for electrostatic charging of the dust smoke particles and for carrying them into the lamp envelope 40. The metal tube 37 is surrounded by a plastic tube 38 which carries the dust not used during spraying into an exhaust chamber 39 from the lamp envelope 40 to be sprayed and from the spraying head 44. The high voltage is supplied by the high-voltage electric conductor 4.

Figure 5:
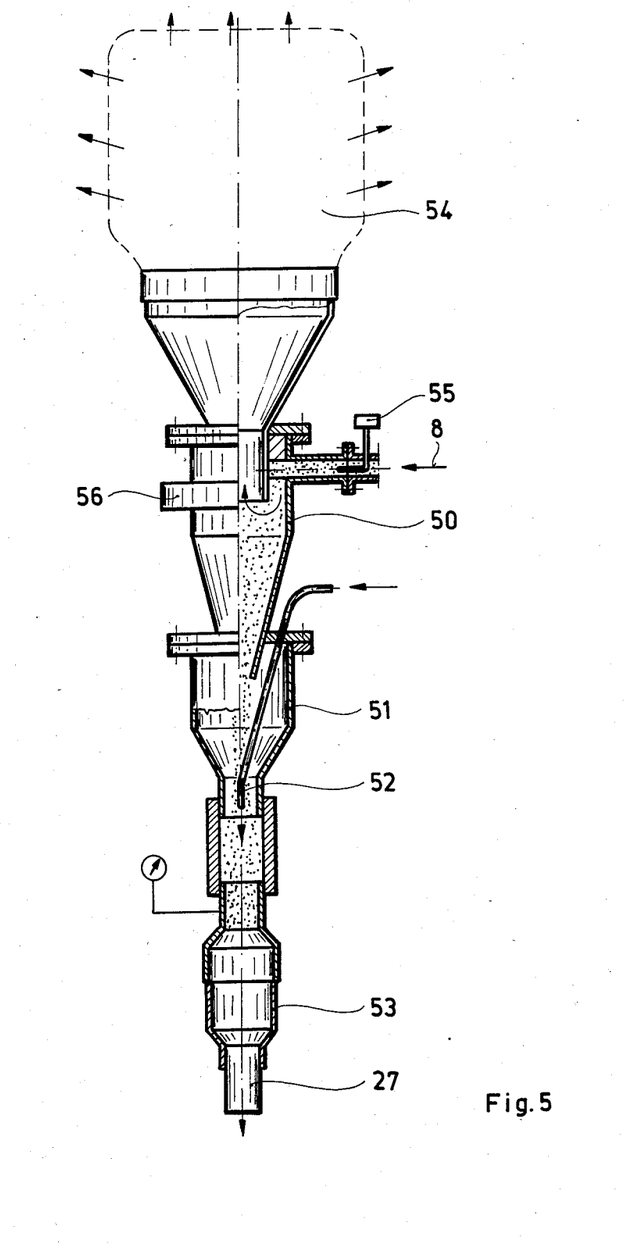
FIG. 5 shows a cross-section of a unit for recovering and recirculating the dust in the apparatus for electrostatic spraying.

In FIG. 5 the system for recovering the dust non-used in the process of spraying is shown. The collected mixture of air and dust is supplied by means of the exhaust system 8 into a grounded dust extracting cyclone 50 made of acid-resistant steel. Before the input orifice of the exhaust system 8 an ionizing electrode 55 connected to a negative high-voltage supply pole is arranged. The charged dust particles will be separated on the wall of the dust extracting cyclone 50 connected to ground. This layer adheres well and can be separated from the wall by means of a pneumatic vibrator 56 and the dust falls into the conic container 51. On the bottom of the conic container 51 an air jet pump 52 is arranged and this pump is connected to the tube 27 of the dust generator 20 through the air-operated rubber lock 53. On the outlet of the dust extracting cyclone 50 a dust filter 54 is arranged which filters the dust leaving the dust extracting cyclone 50. For reasons of environmental protection double filtering is necessary and it can be ensured.

The following description relates to the whole apparatus on the basis of the FIG. 2.

The apparatus is intended to supply the prepared dust of outstanding quality to the inner space of a glass envelope to be sprayed, to deposit in an electrostatic process the dust on the inner wall of the vessel, and thereafter by applying heat treatment to fix the dust on the wall of the lamp vessel.

The dust generator 20 shown in general in FIG. 2 can be seen in detail in FIG. 3. During generating the dust smoke used for electrostatic spraying, the dust 31 intended to be used for spraying fills the conic part of the container 21 to two-thirds of its height. This dust layer is loosened by the air stream supplied to the container 21 through the porous metal plate 28 and the dust after having been loosened is pulverized by being propelled by means of an air flow nozzle 29 upwards to meet the rotor 24 moving with high rotational speed which breaks it up. The air flow nozzle 29 causes an air stream in an upward direction opposite to the downward flow caused by rotor 24, which creates a circulation through the directing sleeve 25 which forces the air to flow around the inner surface of the outer wall of the dust generator 20 as shown by the arrows in FIG. 3. This stream takes the coarse agglomerated dust particles back to the lower part. A part of the fine dust particles without an agglomerated fraction moves upwards between the outer wall of the container 21 and the directing sleeve 25 and flows over the top and newly through the rotor 24, so that if it contains any newly agglomerated parts, these parts are broken up by the rotor 24.

The rotor 24 and the flow-directing sleeve as well are made of metal and connected to ground potential together with the cover plate 22. In this way the electrostatic charges induced by pulverizing, chopping and flowing of the air are led away, thereby decreasing the tendency toward agglomeration.

The dust smoke prepared in the above way is supplied to spray gun 10 through the dust conduit 9. When considering the way of operating the spray gun 10 it is to be mentioned that the spray gun 10 has two positions marked by "a" and "b", as shown in FIG. 4. In position "a" the spray gun 10 is capable of spraying and is in the inner space of the glass envelope to be sprayed. In the position "b" the spray gun 10 is lowered and over it the glass vessel 40 can move and it is possible to carry out cleaning by means of pneumatic air.

In FIGS. 2 and 4 the spray gun 10 is shown in the position a for spraying. The spray gun 10 operates as follows:

The air valve 26 of the dust generator 20 is open and therefrom the dust smoke flows into the inlet of the radial cyclone 35. The rubber lock 36 is closed.

In the radial cyclone 35 the primary coarse particles of the dust and the particles agglomerated in the dust conduit 9 are separated, and therefore through the outlet 46 (submerging tube) only a dust smoke of defined sizes of particles can flow into the metal tube 37 through the dust conduit 34 and the exhaust insert 43. The dust is characterized with a defined spectrum of graininess.

The dust smoke particles flowing through the metal tube 37 connected with the high-voltage electric conductor 4 are charged by the ionizing electrode 3 and thereafter deposited on the wall of the lamp envelope 40 made electrically conductive by heating. As a ground electrode the gas burners 45 are used and surround the vessel to be sprayed in the form of a fan. The dust not bound on the surface of the glass envelope is drawn from the envelope by means of the plastic tube 38 into the exhaust chamber 39, wherefrom it is supplied to the dust extracting cyclone 50.

After the end of the spraying cycle the air valve 26 closes the path for the dust smoke. The spray gun 10 lowers to the lower position "b" and shown in broken lines—a position of exhausting and cleaning. The top of the exhaust chamber 39 is closed by means of the cover plate 42 and the turntable advances. In this position of the spray gun 10 the rubber lock 36 controlled by air is opened and through a valve not shown here and, controlled by means of a programmer, via both the conduit 32 and blowing inlet 43 air is blown in, in order to clean the apparatus, from the source 5. By means of the conduit 32—as it has been described in connection with the dust generator 20—the dust conduit 9 between the dust generator 2 and radial cyclone 35 is cleaned of the dust present therein. Through the blowing inlet 43, arranged in tangential position with the dust conduit 34, the metal tube 37 and the outlet conduit of the radial cyclone 35 can be cleaned. Under influence of the cleaning supplied by the blowing inlet 43 and the dust conduit 34 the dust adhering to the walls is removed through the lower outlet of the radial cyclone 35, the opened rubber lock 36, and the exhaust chamber 39 to the tube 11 and thereby to the dust extracting cyclone 50.

On the end of the exhaust cycle the control mechanism closes the rubber lock 36, the valves for cleaning air, opens the closing plate 42 and thereafter the spray gun 10 returns to the upper portion "a" for spraying.

The dust not bound during the electrostatic spraying and made free in the conduit system by means of exhaust cleaning is returned to the dust generator 20 and in this way the spraying is a process realized in a closed cycle "without losses", which is an important problem of effectiveness and health protection. The maintenance of the stable dust concentration at the same time is closely dependent on the quantity of the dust in the dust generator 20 and its stable value can be ensured only by continuous return of the dust to the generator. According to the proposed method the dust liberated in the different parts of the spraying process should be collected together and separated in a cyclone, e.g. by means of an electrostatic cyclone constructed according to the Hungarian Patent Application EE-2706. The particles adherent to the walls of the cyclone are removed therefrom by means of a vibrator, and the particles are supplied into the container of the cyclone. If the grains of the dust are in the range from 5 to 20 microns the cyclone effect ensures the separating of the dust, for example in the case of light powders.

The recovered dust can be returned from the conic container 51 of dust extracting cyclone 50 to the dust generator 20 by means of the air jet pump 52.

By means of the apparatus for electrostatic spraying as invented the spraying process of glass envelopes can be carried out with high effectiveness, ensuring a uniform thickness of the layer sprayed, whereby the dust is not agglomerated and the cleaning can be carried out without damaging the environment.

We claim:

1. An apparatus for electrostatically coating the insides of light-transmissive lamp envelopes which comprises:
    a stand;
    a turntable mounted on said stand and formed with means for receiving pairs of such envelopes distributed about said turntable;
    heat radiators shaped to conform to the configurations of said envelopes and flanking same about said turntable for preheating said envelopes;
    a pair of nozzles disposed below said turntable and displaceable upwardly into said envelopes in pairs upon the heating thereof for spraying respective dust streams into the heated envelopes for depositing particles of the dust of said streams upon inner surfaces thereof;
    grounded gas burners for heating said envelopes during said spraying and establishing an electrical circuit between the glass of the envelopes and the gas flame;
    an electrostatic voltage source connected to said nozzles for negatively charging said particles of the dust so that the particles are electrostatically attracted to said envelopes due to the electric field generated between the electrostatic voltage source and the grounded gas burner;
    homogenizing means connected with said nozzles for forming said streams and including a rotary chopper for breaking up dust agglomerates and dispersing said dust in a gas to form said streams;
    means associated with each of said nozzles for exhausting excess dust from said envelopes;
    means for transporting said dust streams connected between each of said nozzles and said homogenizing means and including a cyclone for removing large particles from said streams; and
    cleaning means including a blowing inlet connected between each of said cyclones and the respective nozzle for cleaning same.

2. The apparatus defined in claim 1 wherein said homogenizing means includes a generally cylindrical vessel formed with a frustoconical lower portion, a gas-permeable plate closing the bottom of said lower portion and traversed by said gas for suspending said particles in said homogenizing means, said homogenizing means further comprising a cylindrical guide sleeve disposed above said lower portion and surrounding said rotary chopper and a valve at an upper portion of said vessel connecting same with said nozzle, said means for exhausting excess dust from said envelopes being provided with means for returning the exhausted dust to said lower portion.

3. The apparatus defined in claim 1 wherein said heat radiators are heated by respective flames connecting said radiators to ground.

* * * * *